US008215350B2

(12) United States Patent
Roder et al.

(10) Patent No.: US 8,215,350 B2
(45) Date of Patent: *Jul. 10, 2012

(54) TRUCK RACING TIRE (75) Inventors: Daniel Roder, Eii (LU); Tom Dominique Linster, Gilsdorf (LU); Fahri Ozel, Eischen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/639,072

(22) Filed: Dec. 16, 2009

(65) Prior Publication Data
US 2010/0116388 A1 May 13, 2010

Related U.S. Application Data (62) Division of application No. 11/403,629, filed on Apr. 13, 2006, now abandoned.

(60) Provisional application No. 60/671,568, filed on Apr. 15, 2005.

(51) Int. Cl.
*B60C 1/00* (2006.01)
*B60C 11/04* (2006.01)
*B60C 11/24* (2006.01)

(52) U.S. Cl. ............... 152/154.2; 152/209.5; 152/209.8; 152/209.15; 152/209.16; 152/209.17; 152/456; 152/901

(58) Field of Classification Search ............... 152/154.2, 152/209.5, 209.8, 209.9, 209.15, 209.16, 152/209.17, 209.18, 455, 456, 900, 901, 152/DIG. 3
See application file for complete search history.

(56) References Cited

U.S. PATENT DOCUMENTS

| 3,155,135 A | * | 11/1964 | Klenk | 152/209.8 |
| 3,814,160 A | * | 6/1974 | Creasey | 152/154.2 |
| 4,396,052 A | * | 8/1983 | Ahagon et al. | 152/209.5 |

(Continued)

FOREIGN PATENT DOCUMENTS

| DE | 1167204 B | | 4/1964 |
| DE | 1505878 A1 | | 5/1969 |
| DE | 3901624 A1 | | 8/1989 |
| DE | 4122648 A1 | * | 1/1993 |
| DE | 19812934 A1 | | 9/1999 |
| DE | 69716397 T2 | | 7/2003 |

(Continued)

OTHER PUBLICATIONS

Translation for France 1,498,340 (no date).*

*Primary Examiner* — Steven D Maki
(74) *Attorney, Agent, or Firm* — John D. DeLong (57) ABSTRACT

The invention is directed to a pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by the tread having a base region disposed at depth D and a cap region over the base region, the base region and the cap region adjoining along a boundary, the cap region comprising a cap rubber composition having properties measured at 23° C. of: elongation of 400 to 500%, true tensile of 77 to 83 MPa, 300% modulus of 9 to 11 MPa, tensile strength of 14 to 15 MPa, shore A hardness of 63 to 68, rebound of 20 to 25%; and the base region comprising a base rubber composition having properties measured at 23° C. of: elongation of 470 to 520%, true tensile of 135 to 150 MPa, 300% modulus of 13 to 15.5 MPa, tensile strength of 22 to 25 MPa, shore A hardness of 63 to 67, rebound 50 to 55%.

10 Claims, 10 Drawing Sheets

U.S. PATENT DOCUMENTS

| | | | |
|---|---|---|---|
| 4,840,210 A | 6/1989 | Kukimoto | |
| 5,289,862 A * | 3/1994 | Schuster | 152/DIG. 3 |
| 5,622,575 A * | 4/1997 | Meyer-Adlung et al. | 152/209.5 |
| D515,022 S * | 2/2006 | Helt et al. | D12/528 |
| 7,140,410 B2 * | 11/2006 | Helt et al. | 152/154.2 |
| 2005/0101718 A1* | 5/2005 | Lechtenboehmer | 524/492 |
| 2006/0231181 A1* | 10/2006 | Roder et al. | 152/154.2 |

FOREIGN PATENT DOCUMENTS

| | | | |
|---|---|---|---|
| DE | 69727636 T2 | | 1/2005 |
| EP | 250113 A2 | * | 6/1986 |
| EP | 715974 A1 | * | 6/1996 |
| FR | 1498340 A | * | 9/1967 |
| JP | 56-079004 A | * | 6/1981 |
| JP | 2002-240510 A | * | 8/2002 |

* cited by examiner

TRUCK RACING TIRE

This application is a divisional of Ser. No. 11/403,629 filed Apr. 13, 2006 now abandoned, which claims the benefit of Ser. No. 60/671,568, filed Apr. 15, 2005.

BACKGROUND OF THE INVENTION

Tires generally have a tread that is well suited for a specific vehicle application. Certain tread and reinforcement packages specifically designed for a racing truck are well known. The considerations relevant to a tire for such an application are, among others, tread configuration, reinforcement package disposition, and material composition. While existing and commercially available tires developed for truck racing to date have worked well, certain shortcomings in such tires remain. In particular, existing truck racing tire designs are deficient in several key areas.

First, the weight and material utilization in currently available truck racing tires is greater than desired resulting in a tire with less than optimal temperature and weight characteristics. Another problem is that existing tire tread designs for truck racing applications experience irregular wear in the shoulder region of the tire and offer a less than optimal indication of wear. Such irregular shoulder wear results in unpredictable performance and a resultant competitive disadvantage. There is, therefore, a continuing need for a tire providing a predictable and accurate indication of wear in critical regions of the tire.

Still a further problem is that existing tread and tire designs provide less than satisfactory lateral stability and handling and lower than desired resistance in the event of tread damage. A continuing need, accordingly, exists for a truck racing tire that eliminates or mitigates the aforementioned deficiencies.

SUMMARY OF THE INVENTION

The invention is directed to a pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by the tread having a base region disposed at depth D and a cap region over the base region, the base region and the cap region adjoining along a boundary, the cap region comprising a cap rubber composition having properties measured at 23° C. of: elongation of 400 to 500%, true tensile of 77 to 83 MPa, 300% modulus of 9 to 11 MPa, tensile strength of 14 to 15 MPa, shore A hardness of 63 to 68, rebound of 20 to 25%; and the base region comprising a base rubber composition having properties measured at 23° C. of: elongation of 470 to 520%, true tensile of 135 to 150 MPa, 300% modulus of 13 to 15.5 MPa, tensile strength of 22 to 25 MPa, shore A hardness of 63 to 67, rebound 50 to 55%.

BRIEF DESCRIPTION OF THE DRAWINGS

The invention will be described by way of example and with reference to the accompanying drawings in which.

DETAILED DESCRIPTION OF THE INVENTION

Figure 16:
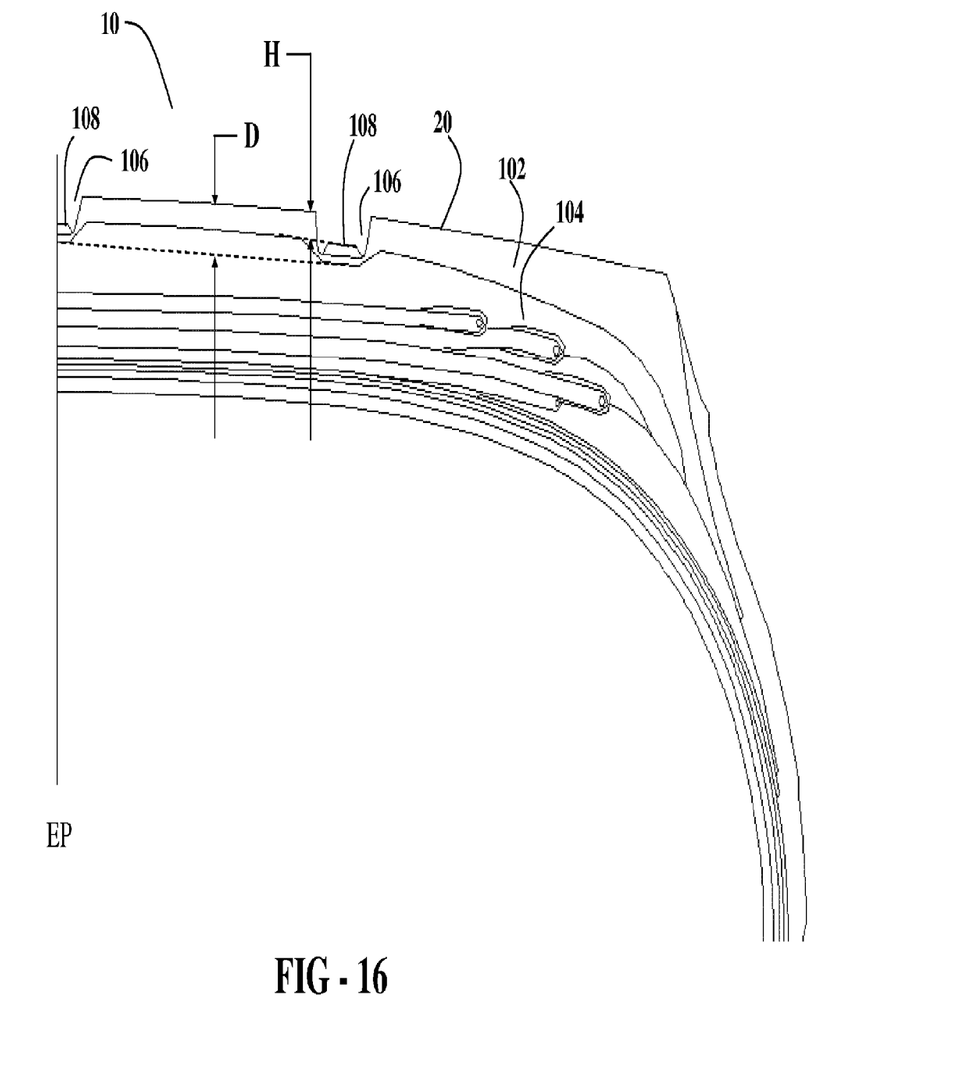
FIG. 16 is an enlarged section view of the tread portion of one embodiment of a tire of the present invention.

The truck racing tire of the present invention includes a tread that may be configured as having a cap/base layer construction in which the cap is composed of a relatively softer compound while the base compound is composed of a harder compound. With reference to FIG. 16, tire 10 includes tread 20 having a tread base 104 disposed at a depth D, and tread cap 102 overlying tread base 104. As shown in the embodiment in FIG. 16, circumferential grooves 106 include tread indicators 108 formed therein; the depth of the wear indicator is at a depth H which is substantially at the boundary between the base 104 and the cap 102. In this embodiment, the tire 10 is shown as having a tread 20 that is symmetric about the equatorial plane EP; in other embodiments the tire may be asymmetric as discussed herein.

The tread may be constituted of a layer of a stiff and cool running tread base rubber compound which facilitates stability and good handling characteristics without heating up the entire tread excessively. The stiffness is indicated by a high G* and the low heat generation ability is indicated by low tan delta as well as a high rebound.

On top of the base compound is assembled a layer of relatively higher heat generating and thus soft, high grip cap rubber compound. The still high maximum elongation indicates good integrity of the tread cap as well as specific durability required for racing.

In one embodiment, the rubber compound formulations for the tread cap and tread base regions may be as indicated in the following table, with amounts given in phr:

| tread cap: | | tread base: | |
| --- | --- | --- | --- |
| S-SBR (15-25% styrene, 35-50% vinyl) | 60-80 | polyisoprene | 100 |
| polyisoprene | 20-40 | carbon black | 30-50 |
| carbon black | 60-90 | silica | 10-20 |
| silica | 10-20 | | |

Along with the materials listed in the above table, the tread base and tread cap compounds further comprise conventional amounts of curatives such as sulfur, accelerators, zinc oxide, and stearic acid; antidegradants including antioxidants and antiozonants; processing aids including process oils and waxes; and silane coupling agents.

In one embodiment, the tread cap and tread base may have physical properties as given in the following table:

| tread cap: | | tread base: | |
|---|---|---|---|
| @ 23° C.: | | @ 23° C. | |
| elongation | 400-500% | elongation | 470-520% |
| true tensile | 77-83 MPa | true tensile | 135-150 MPa |
| modulus 300% | 9-11 MPa | modulus 300% | 13-15.5 MPa |
| tensile strength | 14-15 MPa | tensile strength | 22-25 MPa |
| shore A hardness | 63-68 | shore A | 63-67 |
| rebound | 20-25% | rebound | 50-55% |
| @ 100° C.: | | @ 100° C.: | |
| elongation | 300-350% | tan delta 10% @ | 0.115-1.145 |
| true tensile | 27-32 MPa | 100° C. | |
| tensile strength | 6.5-8 MPa | G* 10% @ 100° C. | 1.6-1.7 MPa |
| shore A hardness | 59-59 | | |
| rebound | 50-57% | | |
| tan delta 10% @ | 0.22-0.27 | | |
| 90° C. | | | |
| G* 10% @ 90° C. | 1.3-1.4 MPa | | |

More broadly, the rubber compositions for use in the base region and the cap region may contain at least one rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The rubber composition may optionally include from 0 to about 20 phr of 3,4-polyisoprene rubber. The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N100, N110, N121, N134, N220, N231, N234, N242, N293, N299, N300, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

$$Z\text{-Alk-}S_n\text{-Alk-}Z \qquad \text{II}$$

in which Z is selected from the group consisting of where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis (triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl)disulfide and 3,3'-bis(triethoxysilylpropyl)tetrasulfide. Therefore, as to formula II, Z may be where $R^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—$CH_2CH_2CH_2SiX_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas III or IV

III

IV wherein: R is a methyl or ethyl group;

R' is identical or different and is a $C_9$-$C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group or R'''$_3$Si, where R''' is $C_1$-$C_{30}$ branched or unbranched alkyl or alkenyl group, aralkyl group or aryl group, R'' is a branched or unbranched, saturated or unsaturated, aliphatic, aromatic or mixed aliphatic/aromatic divalent $C_1$-$C_{30}$ hydrocarbon group;

X is SH where n=1 and m=1, S where n=2 and m=1-10 and mixtures thereof, S(C=O)—R''' where n=1 and m=1 or H where n=1 and m=1;

R'' may mean $CH_2$, $CH_2CH_2$, $CH_2CH_2CH_2$, $CH_2CH_2CH_2CH_2$, $CH(CH_3)$, $CH_2CH(CH_3)$, $C(CH_3)_2$, $CH(C_2H_5)$, $CH_2CH_2CH(CH_3)$, $CH_2CH(CH_3)CH_2$ or In one embodiment, the sulfur containing organosilicon compound is of formula III, R is ethyl, R' is $C_{12}$-$C_{14}$ alkyl, R'' is $CH_2CH_2CH_2$, X is SH, n is 1 and m is 1. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.1 to 8 phr, alternatively with a range of from 0.5 to 6 phr. Typical amounts of tackifier resins, if used, comprise about 0.5 to about 10 phr, usually about 1 to about 5 phr. Typical amounts of processing aids comprise about 1 to about 50 phr. Representative processing aids may be for example, process oils including aromatic, paraffinic, napthenic oils, vegetable oils, and low PCA oils, such as MES, TDAE, SRAE and heavy naphthenic oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Figure 1:
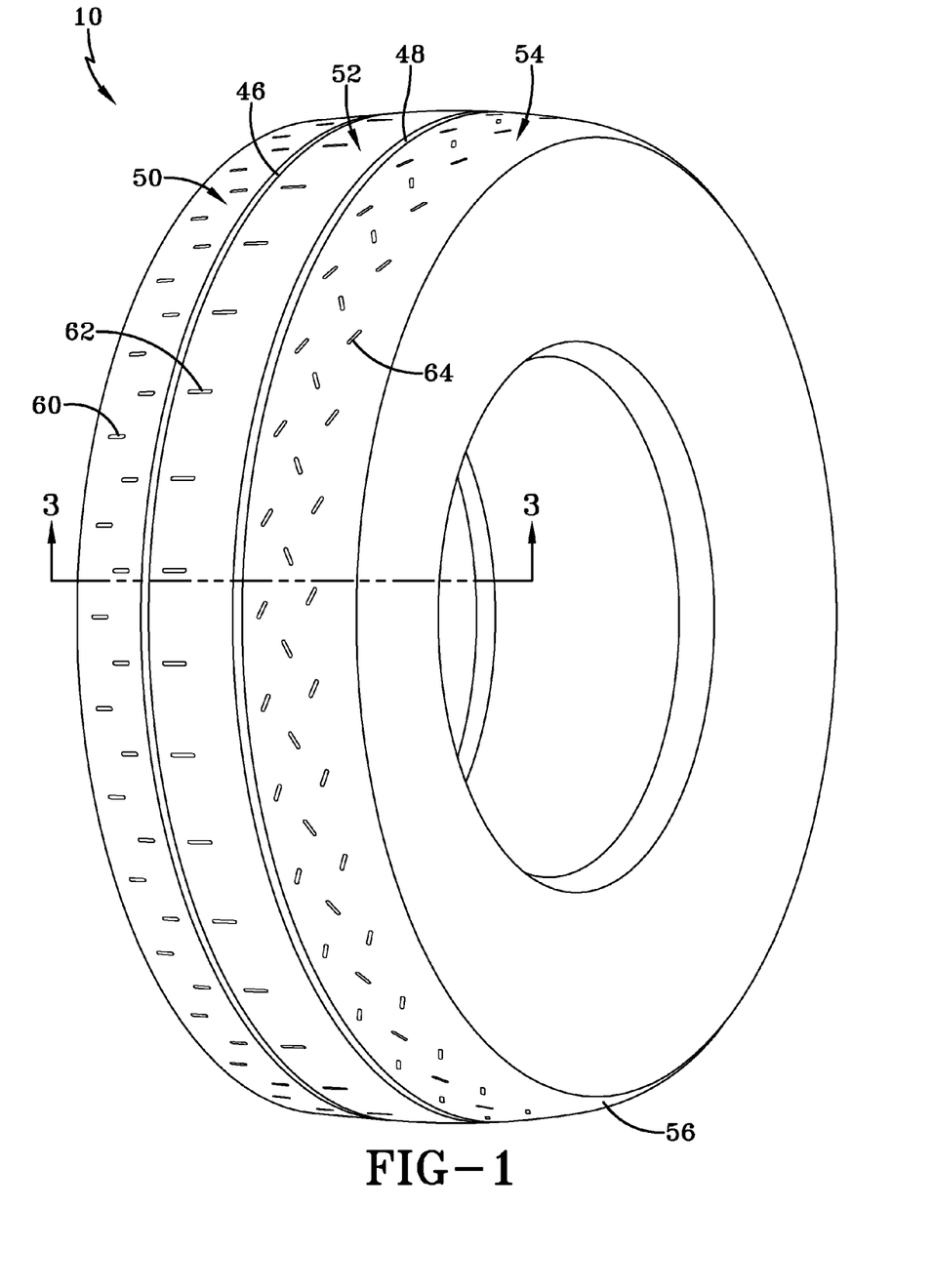
FIG. 1 is a perspective side elevation view of a tire configured according to the present invention.
Figure 2:
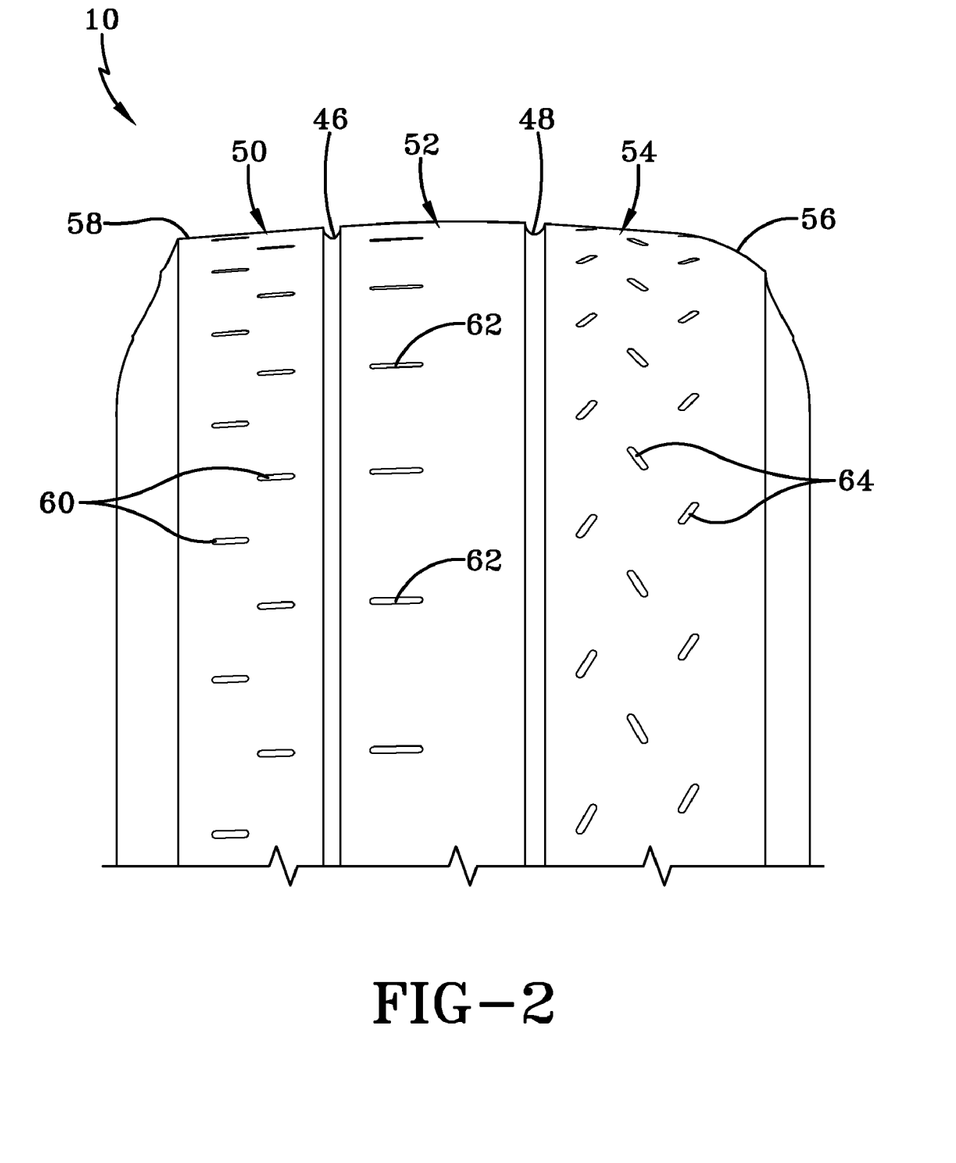
FIG. 2 is a front elevation view of a portion of the tire of FIG. 1.
Figure 3:
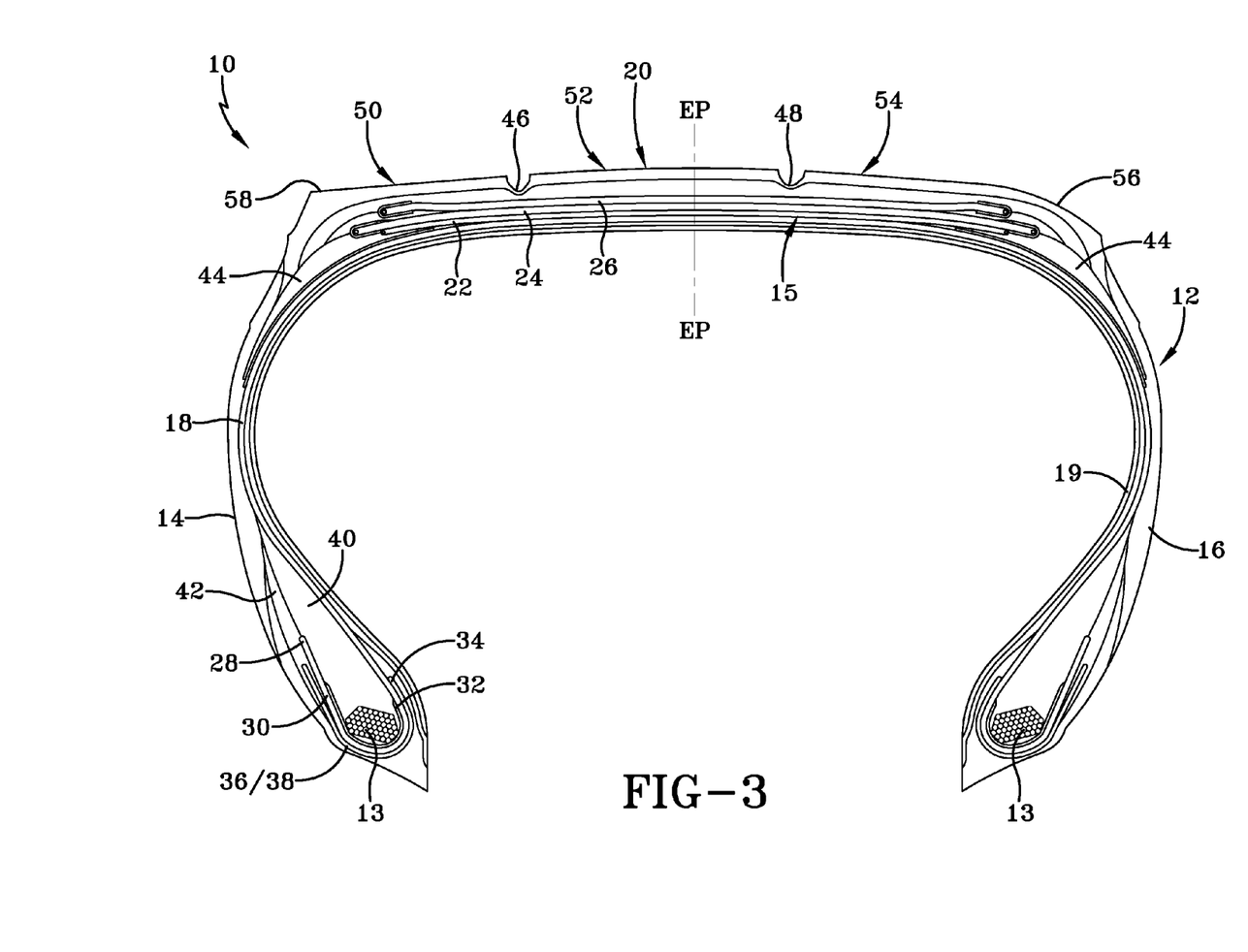
FIG. 3 is a transverse sectional view through the tire of FIG. 1.

With reference now to FIGS. 1, 2, and 3, one alternative embodiment of a truck racing tire 10 is depicted in accordance with the subject invention, preferably for use on either the front or rear axles of a racing truck. While intended specifically for truck racing tires, the principles of the invention will find alternative uses in other applications apparent to those skilled in the art. The following definitions will aid in understanding of the drawings:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Carcass plies" comprise parallel longitudinal reinforcing members which are wrapped around the beads.

"Circumferential" means lines or directions extending along the perimeter of the surface of the annular tread perpendicular to the axial direction.

"Crown" refers to that portion of the tire within the width area of the tread in the vicinity of the tread.

"Design feature" includes enough of the tread pattern to constitute at least one notch on each tread region.

"Equatorial plane" refers to the plane perpendicular to the tire's axis of rotation and passing through the center of its tread. "Tread Shoulder Rib" refers to portion of tread adjacent the tire sidewall.

"Footprint" refers to the contact patch or area of contact of the tire tread with a flat surface at zero speed and under normal load and pressure or under specified load, pressure and speed conditions.

"Global treadwear" refers to normal treadwear, generally evenly distributed around a tire.

"Irregular treadwear" refers to uneven patterns of wear, sometimes localized where one side or edge of the tread wears faster than another.

"Lateral Edge" means the axially outermost extremes of the tread.

"Radial" and "radially" are used to mean directions radially toward or away from the axis of rotation of the tire.

The tire 10 has a tread 20 and a casing 12. The casing 12 has two sidewalls 14,16 one or more radial plies 18 extending from and wrapped about two annular beads 13 and a belt reinforcement structure 15 located radially between the tread 20 and the plies 18.

The plies 18 and the belt reinforcement structure 15 are cord reinforced elastomeric material, the cords being preferably steel wire filaments and the elastomer preferably being a vulcanized rubber material. Similarly, the annular beads 13 have steel wires wrapped into a bundle known as the bead core.

The liner 19 is a component of preferably halobutyl rubber that forms a somewhat air impervious chamber to contain the air pressure when the tire 10 is inflated. As shown, the belt structure of the preferred embodiment tire has three cord reinforced belts 22, 24, and 26. Additionally, the belt reinforcement structure 15 includes a gum strip of rubber material 28. The ply turnup 30 in the bead area is reinforced with a flipper 32, chipper 34, gum and fabric chafers 36,38, gum strips 40 and elastomeric wedges 42.and a plurality of elastomeric strips or wedges 44 in the lateral extremes of the belts 15 in proximity of the tread lateral edge. Although not required to the practice of the inventive concept, these features are disclosed as features employed in the preferred embodiment.

The tread 20 preferably has a pair of circumferentially continuous grooves 46, 48 which divide the tread 20 into three tread ribs, including a pair of shoulder ribs 50, 54 separated by an intermediate rib 52. The tread 20 is asymmetrically configured in that the shoulder rib 54 is wider than the shoulder rib 50. The equatorial plane of the tire, as best seen in FIG. 3, extends off center through the center rib 52. The wide shoulder rib 54 is situated on the outside on a front axle of a truck or on the inside when mounted on a rear axle to optimize vehicle stability and handling. The rib 54 is configured having a rounded lateral edge surface 56 and the rib 50 is provided with an angled lateral edge surface 58 which optimize vehicle stability and handling. More grooves may be used dependent on the width of the tread and other design considerations such as, but not limited to, the alternatively configured tread depicted in FIGS. 13-15.

As shown in FIGS. 1 through 3, the tire 10 uppermost belt 26 is of relatively reduced distance from the tread 20, on the order of 2 to 5 mm. Additionally, the tread 20 is configured to be relatively reduced thickness, preferably dimensioned as 5 mm. The reduced thickness of tread and undertread between the tread 10 and belt 26 reduces material content, for optimized handling, stability, and temperature control.

Figure 6:
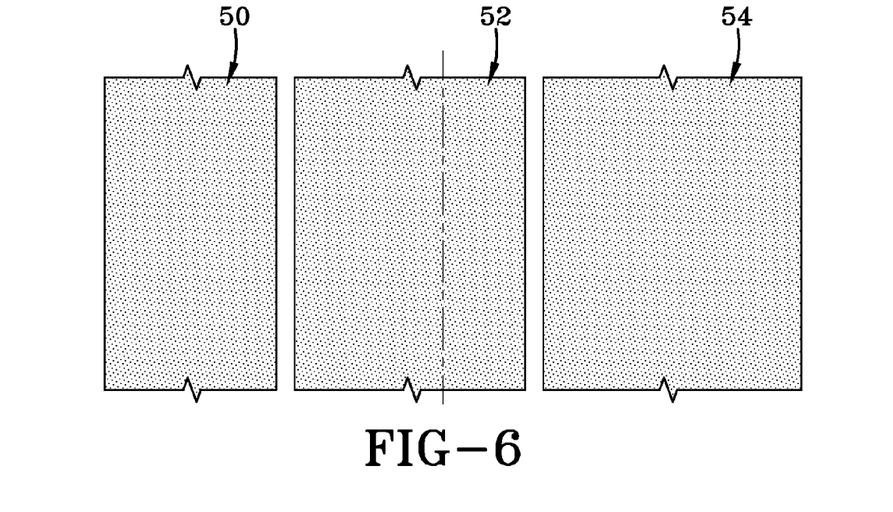
FIG. 6 is a top plan view of a tire tread portion indicating a wear condition.
Figure 7:
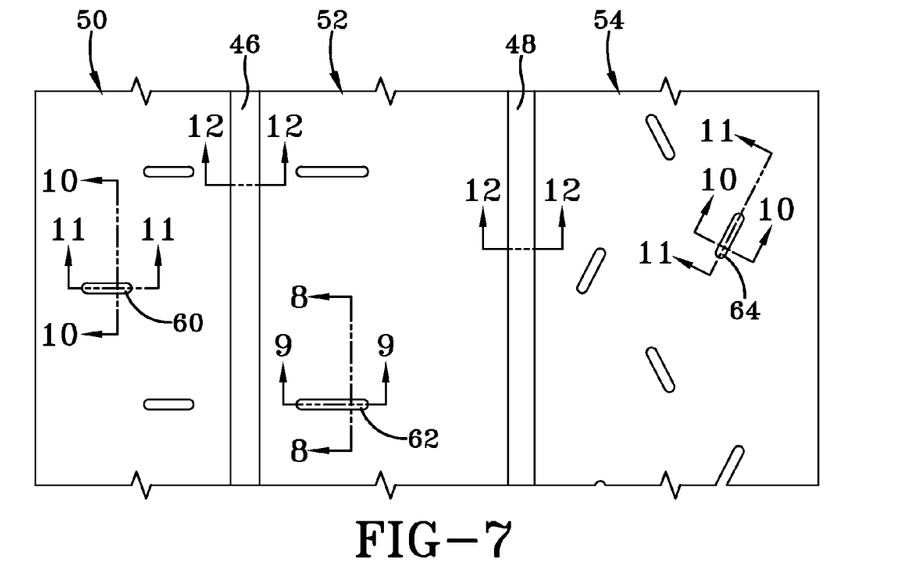
FIG. 7 is a top plan view of a tire tread portion showing notch patterns within each tread rib.
Figure 8:
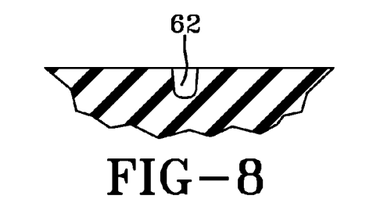
FIG. 8 is a section view through a notch of FIG. 7 taken along the line 8-8.
Figure 9:
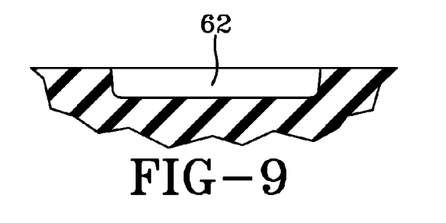
FIG. 9 is a longitudinal section view through a notch of FIG. 7 taken along the line 9-9.
Figure 10:
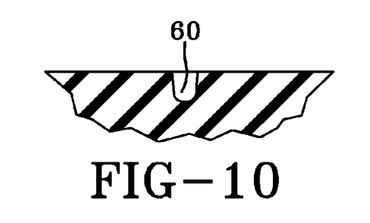
FIG. 10 is a transverse section view through a notch of FIG. 7 taken along the line 10-10.
Figure 11:
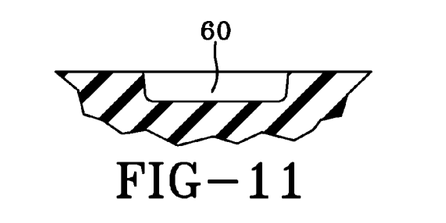
FIG. 11 is a longitudinal section view through a notch of FIG. 7 taken along the line 11-11.
Figure 12:
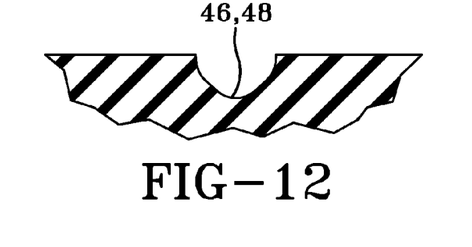
FIG. 12 is a transverse section view through a groove of FIG. 7 taken along the line 12-12.

In use, the tire ribs 50, 52, and 54 wear and the rib depth is reduced. In order to indicate tread wear, a respective pattern of circumferentially spaced notches 60, 62, 64 are formed therein, respectively. As the tread wears, the notches are reduced in depth and eventually eliminated as depicted in FIG. 6. In practice, the tread will generally wear at different rates causing the notches to reduce in depth accordingly. By monitoring the depths of the notches, the wear pattern and level of wear may be ascertained. Each notch 60, 62, 64, as shown in FIGS. 7 through 12, are generally U-shaped in cross-section and has an initial depth of 3.5 mm. The depth of the grooves 46, 48 (see FIG. 12) is preferably on the order of 5.1 mm. Wear indicators in the form of markings are placed in sidewalls of the grooves (not shown) at a depth equivalent to the depth of notches 60, 62, 64 (preferably 3.5 mm) thus providing an additional indication of wear as the tread 20 is reduced. It will further be noted that the notch pattern in each rib 50, 52, 54 is preferably distinctive to each rib and the notches may be oriented in a staggered configuration from rib to rib or, as shown with regard to rib 54, and/or oriented at an angle relative to the equatorial plane of the tire. By varying the distribution and orientation of the notches from tire rib to tire rib and around the circumference of the tire, a clearer indication of wear pattern and extent may be determined.

Figure 4:
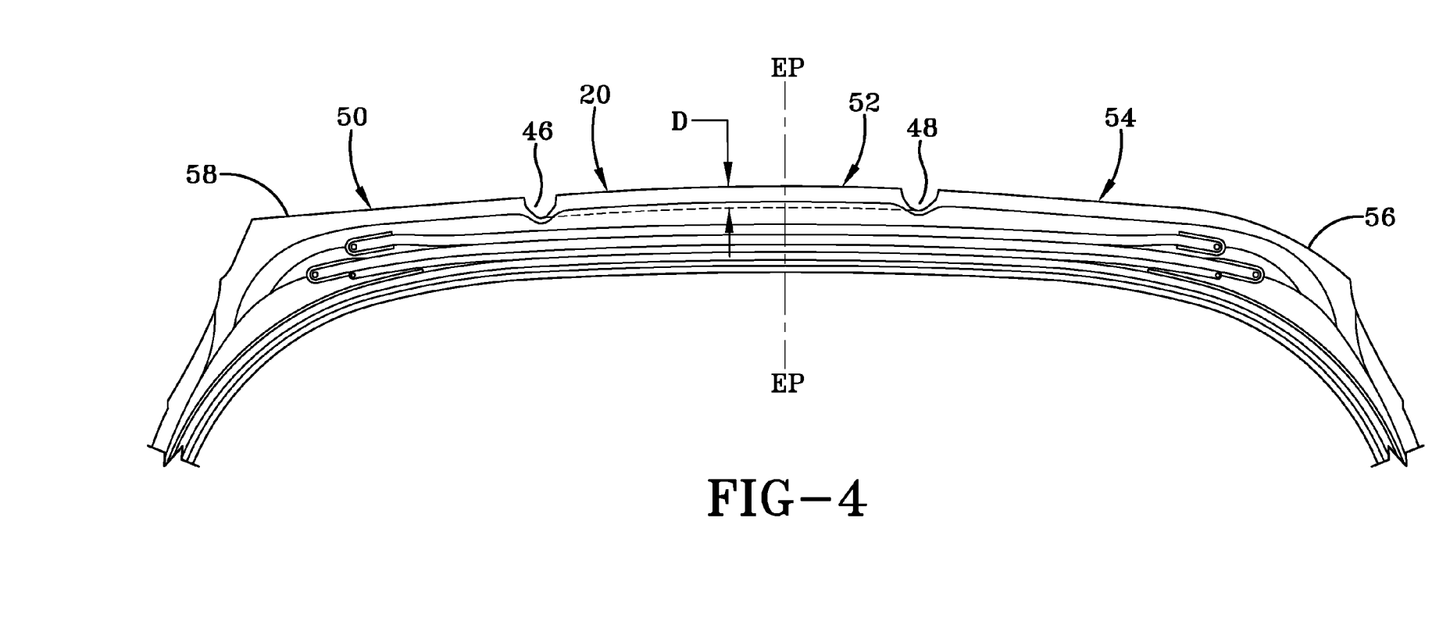
FIG. 4 is an enlarged section view of the tread portion of the tire of FIG. 1.
Figure 5:
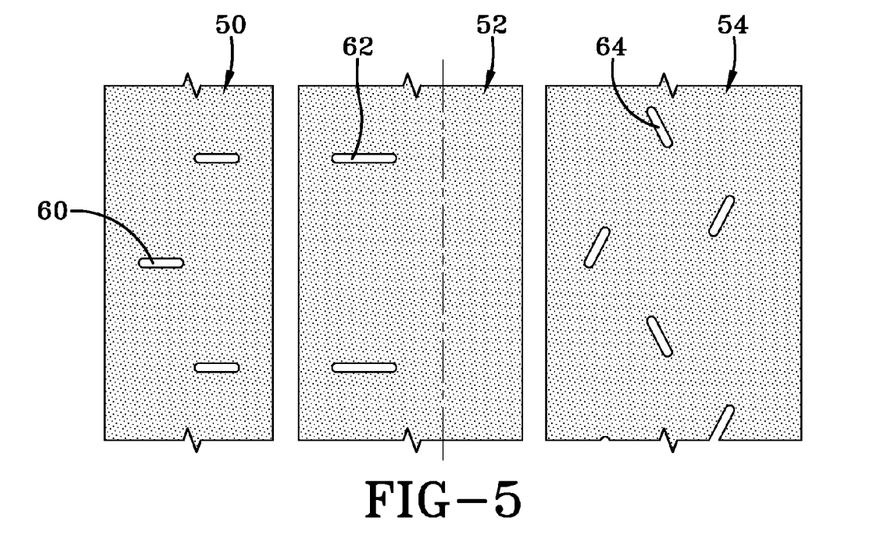
FIG. 5 is a top plan view of a portion of the tire tread.

Additionally, it is preferred that the tread 20 be configured as having a cap/base layer construction in which the cap is composed of a relatively softer compound while the base compound is composed of a harder compound. Such compounds are commercially available. The softer cap compound provides high griping and handling performance characteristics while hard and cool running compound in the tread base improves tire lateral stability and handling, reduces heat generation, and improves the tire's resistance characteristics in the event the tread is damaged. Location of the cap and base boundary is further preferably at 3.5 mm from the tread surface so as to allow the user to detect the harder base layer when the tread cap is worn away. FIG. 4 illustrates in broken line the boundary between the softer cap and harder base at a depth "D". Thus, the dual composition of the tread along a boundary line placed at the same depth as the notch and groove depths provides yet a further indication of tire wear. Such a redundancy increases the likelihood that the driver will immediately detect an unsafe wear condition within the tire.

Figure 13:
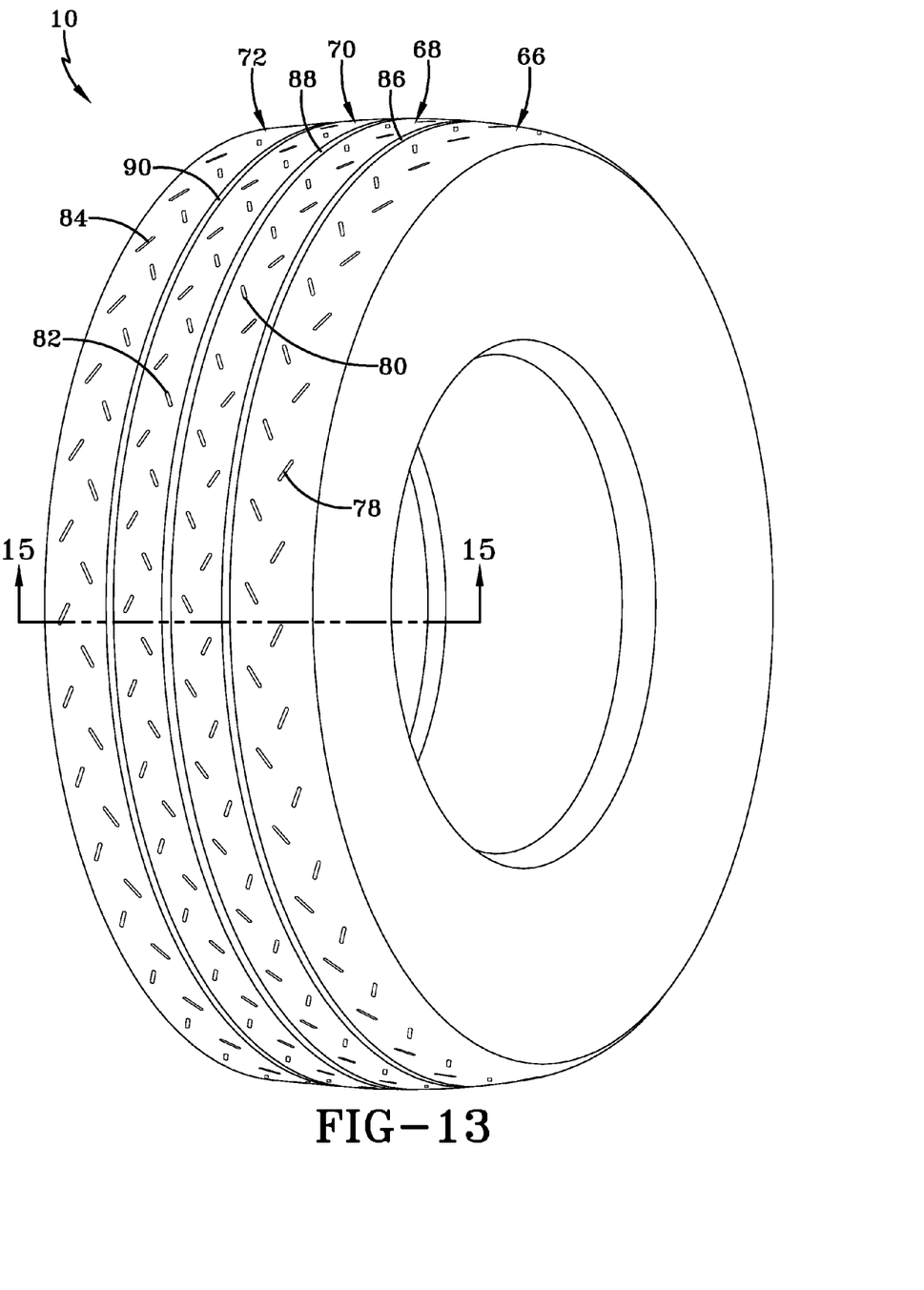
FIG. 13 is a perspective side elevation view of an alternative embodiment of a tire configured pursuant to the invention.
Figure 14:
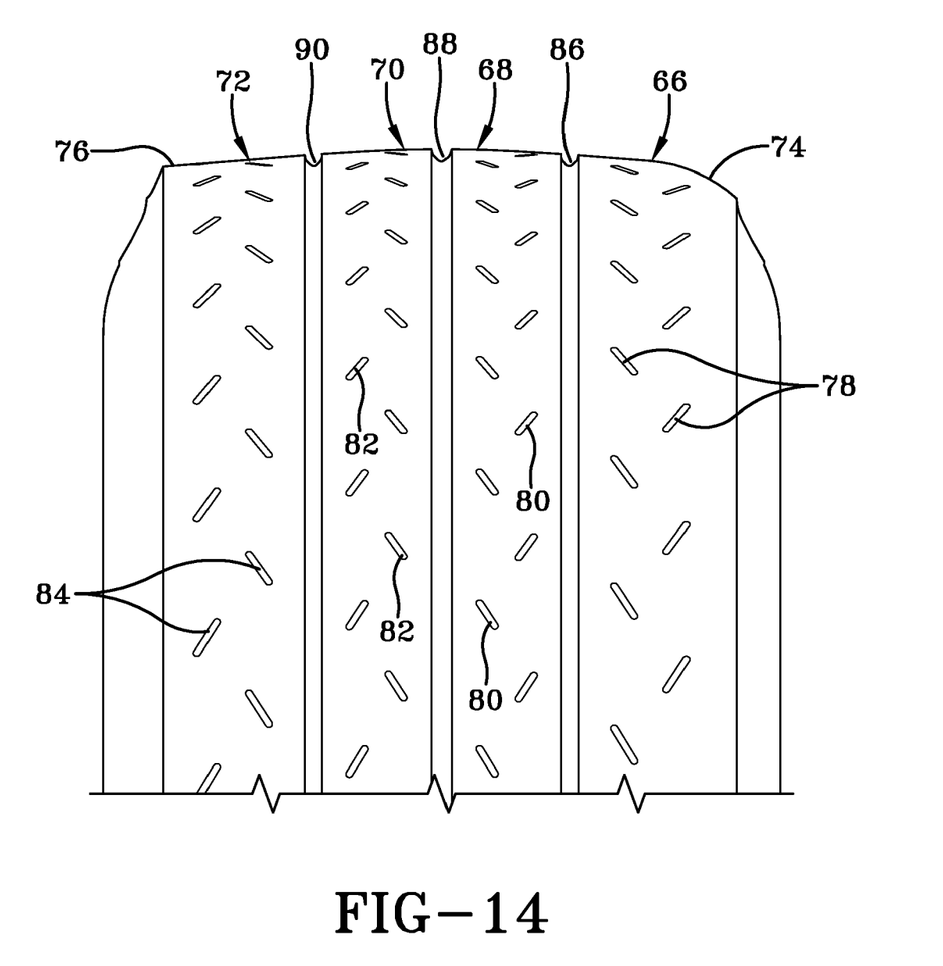
FIG. 14 is a front elevation view of a portion of the tire of FIG. 13.
Figure 15:
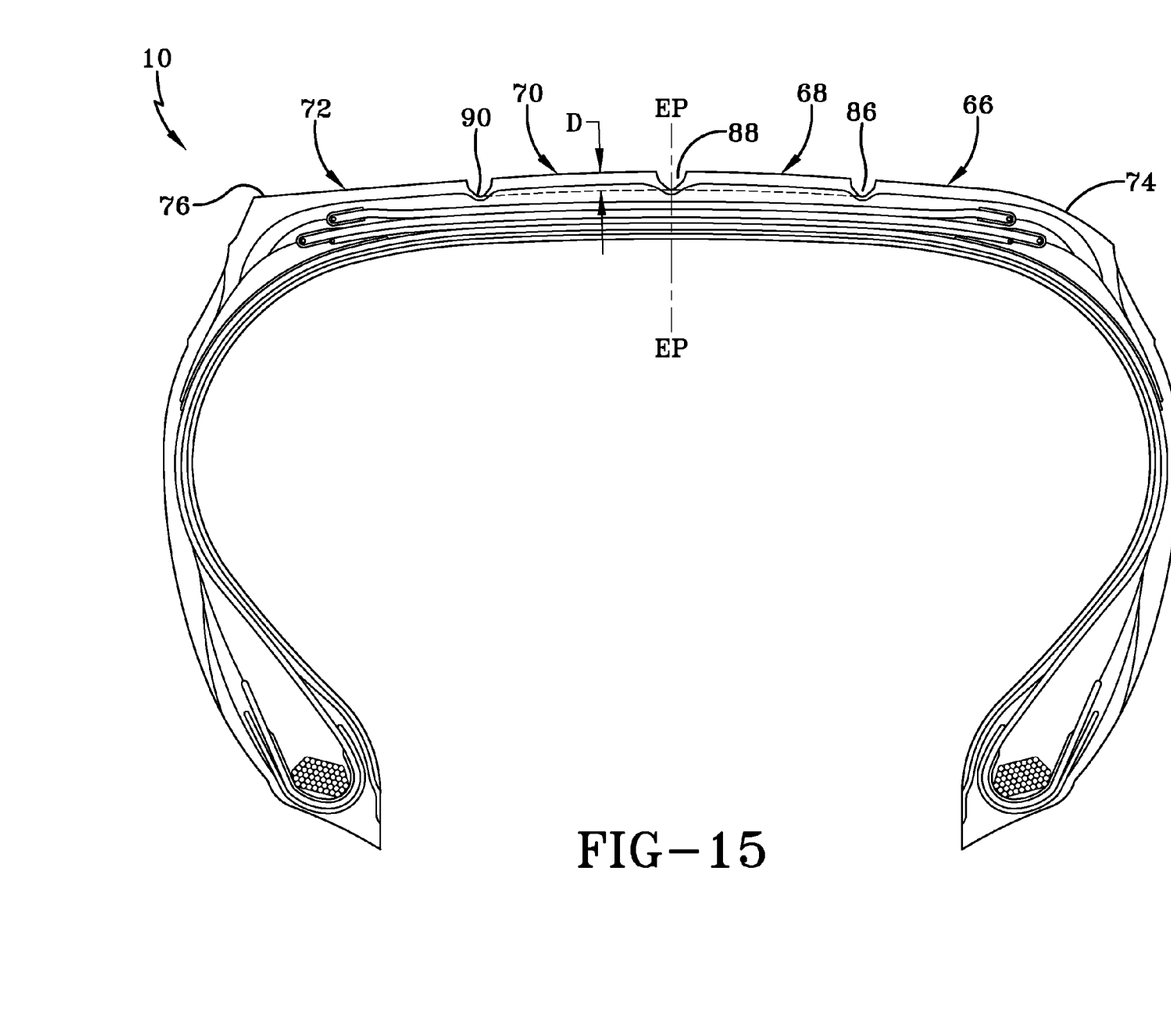
FIG. 15 is a transverse section view through the tire of FIG. 13.

FIGS. 13-15 illustrate one alternative embodiment of invention in which four ribs 66, 68, 70, and 72 are provided, outermost shoulder ribs 66, 72 having a rounded shoulder 74 and a squared shoulder region, respectively. Notches 78, 80, 82, 84, as in the previous embodiment, are incorporated into the ribs for heat and water evacuation as well as for tread wear indication. Grooves 86, 88, and 90 extend circumferentially and define the ribs.

From the foregoing, it will be apparent that the subject tire for truck racing in a unique belt package, tread pattern and composition provides enhanced handling, tire grip, and tread endurance while optimizing weight. The wider shoulder rib provides for good handling and high lateral stability and the circumferential grooves for water and heat evacuation. The tread wear indicators in the grooves provide for wear follow-up and are at a depth common to the depth of the rib notches. The notches in the ribs provide gripping on dust or water and also, being distributed in select patterns circumferentially, provide for localized wear detection. The rounded shoulder is placed preferably outside on a front axle and inside on a rear axle to optimize vehicle stability and handling.

In using three belts, rather than a greater number, weight is reduced and better temperature dispersion is achieved. Moreover, the undertread thickness is reduced for optimized weight and temperature characteristics. Use of a softer cap composition and harder base composition in the tread acts to prevent rapid damage to the tire and wear from reaching the carcass. The point in time when the tire is worn will be perceived by the user due to the position of the boundary between the softer cap and the harder tread base at a depth common to the notch tread wear indicators.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention is further illustrated by the following non-limiting example.

EXAMPLE

Tread cap and base compounds are contemplated to be fabricated using the compound recipes as shown in Table 1. Cured compounds are contemplated to be tested and expected to have properties within the ranges shown in Table 2.

TABLE 1

| tread cap: | | tread base: | |
|---|---|---|---|
| S-SBR (15-25% styrene, 35-50% vinyl) | 70 phr | polyisoprene | 100 phr |
| polyisoprene | 30 phr | carbon black (ASTM N100) | 42 phr |
| carbon black (ASTM N300) | 77 phr | cure promoters | 10.7 phr |
| cure promoters | 10.7 phr | antidegradants | 6.5 phr |
| antidegradants | 4.5 phr | processing aids | 2 phr |
| processing aids | 37 phr | silica | 15 phr |
| sulfur | 0.4 phr | silane coupling agent | 2 phr |
| silane coupling agent | 3 phr | sulfur | 0.9 phr |
| silica | 15 phr | | |

TABLE 2

| tread cap: | | tread base: | |
|---|---|---|---|
| @ 23° C.: | | @ 23° C. | |
| elongation | 400-500% | elongation | 470-520% |
| true tensile | 77-83 MPa | true tensile | 135-150 MPa |
| modulus 300% | 9-11 MPa | modulus 300% | 13-15.5 MPa |
| tensile strength | 14-15 MPa | tensile strength | 22-25 MPa |
| shore A hardness | 63-68 | shore A | 63-67 |
| rebound | 20-25% | rebound | 50-55% |
| @ 100° C.: | | @ 100° C.: | |
| elongation | 300-350% | tan delta 10% @ 100° C. | 0.115-1.145 |
| true tensile | 27-32 MPa | | |
| tensile strength | 6.5-8 MPa | G* 10% @ 100° C. | 1.6-1.7 MPa |
| shore A hardness | 59-59 | | |
| rebound | 50-57% | | |
| tan delta 10% @ 90° C. | 0.22-0.27 | | |
| G* 10% @ 90° C. | 1.3-1.4 MPa | | |

What is claimed is:

1. A pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by: the tread having a first wear indicator disposed within at least one circumferential groove and a second wear indicator disposed within a rib for confirmation of tread wear; a plurality of elongate discrete notches formed to extend into the tread first shoulder rib, second shoulder rib, and intermediary rib in respective circumferential patterns; at least one notch in each circumferential pattern extends to a depth corresponding with the depth of the first wear indicator within the at least one circumferential groove;

the tread having a base region disposed at depth D and a cap region over the base region, the base region and the cap region adjoining along a boundary, the cap region comprising a cap rubber composition having properties measured at 23° C. of: elongation of 400 to 500%, true tensile of 77 to 83 MPa, 300% modulus of 9 to 11 MPa, tensile strength of 14 to 15 MPa, shore A hardness of 63 to 68, rebound of 20 to 25%; and the base region comprising a base rubber composition having properties measured at 23° C. of: elongation of 470 to 520%, true tensile of 135 to 150 MPa, 300% modulus of 13 to 15.5 MPa, tensile strength of 22 to 25 MPa, shore A hardness of 63 to 67, rebound 50 to 55%.

2. A tire according to claim 1, wherein the second wear indicator comprising a tread base region disposed at depth D constructed from relatively harder material and a cap region over the base region constructed from relatively softer material, the base region and the cap region adjoining along a boundary.

3. A tire according to claim 2 wherein the first wear indicator within the at least one groove is at the depth of the boundary between the base region and the cap region.

4. An asymmetric pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by the first shoulder rib having width wider than the second shoulder rib and a substantially rounded upper surface across an outer edge region;
the second shoulder rib having a substantially flat upper surface across an outer edge region; and
the tread having a first wear indicator disposed within at least one circumferential groove and a second wear indicator disposed within a rib for confirmation of tread wear;
wherein the second wear indicator comprising at least one notch formed to extend into at least one rib to a depth substantially corresponding to the depth of the first wear indicator; the tread having a base region disposed at depth D and a cap region over the base region, the base region and the cap region adjoining along a boundary, the cap region comprising a cap rubber composition having properties measured at 23° C. of: elongation of 400 to 500%, true tensile of 77 to 83 MPa, 300% modulus of 9 to 11 MPa, tensile strength of 14 to 15 MPa, shore A hardness of 63 to 68, rebound of 20 to 25%; and the base region comprising a base rubber composition having properties measured at 23° C. of: elongation of 470 to 520%, true tensile of 135 to 150 MPa, 300% modulus of 13 to 15.5 MPa, tensile strength of 22 to 25 MPa, shore A hardness of 63 to 67, rebound 50 to 55%.

5. A tire according to claim 4, wherein further characterized by the second wear indicator comprising a tread base region disposed at depth D constructed from relatively harder material and a cap region over the base region constructed from relatively softer material, the base region and the cap region adjoining along a boundary.

6. A tire according to claim 5, wherein the first wear indicator within the at least one groove is at the depth of the boundary between the base region and the cap region.

7. A tire according to claim 4, wherein further characterized by at least one belt reinforcement structure located radially from the tread, the belt reinforcement structure comprising three belts.

8. A tire according to claim 4, wherein further characterized by a plurality of elongate discrete notches formed to extend into the tread first shoulder rib, second shoulder rib, and intermediary rib in respective circumferential patterns.

9. A tire according to claim 8, wherein further characterized by at least one notch in each circumferential pattern extends to a depth corresponding with the depth of the first wear indicator within the at least one circumferential groove.

10. An asymmetric pneumatic radial ply truck tire having a tread with a tread depth D, at least two circumferential grooves dividing the tread into at least a first shoulder circumferential rib, an intermediary circumferential rib, and a second shoulder circumferential rib, the tire being characterized by: the first shoulder rib having a width wider than the second shoulder rib and a substantially rounded upper surface across an outer edge region; the second shoulder rib having a substantially flat upper surface across an outer edge region; and the tread having a base region disposed at depth D constructed from relatively harder material and a cap region over the base region constructed from relatively softer material, the base region and the cap region adjoining along a boundary; wherein at least one groove has a wear indicator formed therein at a preselected depth; wherein the boundary between the base region and the cap region is substantially at the preselected wear indicator depth within the one groove; and at least one tread region has at least one notch formed therein extending to the preselected wear indicator depth;

the tread having a base region disposed at depth D and a cap region over the base region, the base region and the cap region adjoining along a boundary, the cap region comprising a cap rubber composition having properties measured at 23° C. of: elongation of 400 to 500%, true tensile of 77 to 83 MPa, 300% modulus of 9 to 11 MPa, tensile strength of 14 to 15 MPa, shore A hardness of 63 to 68, rebound of 20 to 25%; and the base region comprising a base rubber composition having properties measured at 23° C. of: elongation of 470 to 520%, true tensile of 135 to 150 MPa, 300% modulus of 13 to 15.5 MPa, tensile strength of 22 to 25 MPa, shore A hardness of 63 to 67, rebound 50 to 55%.

* * * * *